(12) United States Patent
Huang

(10) Patent No.: US 8,125,356 B2
(45) Date of Patent: Feb. 28, 2012

(54) ELECTRONIC DEVICE PROVIDING A NUMBER INPUT SYSTEM

(75) Inventor: Chia-Chia Huang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 697 days.

(21) Appl. No.: 12/324,851

(22) Filed: Nov. 27, 2008

(65) Prior Publication Data

US 2009/0267807 A1    Oct. 29, 2009

(30) Foreign Application Priority Data

Apr. 24, 2008  (CN) .......................... 2008 1 0301274

(51) Int. Cl.
*H03M 11/00*    (2006.01)

(52) U.S. Cl. ............ 341/22; 341/27; 345/168; 345/173; 710/67

(58) Field of Classification Search .................... 341/20, 341/22, 27; 345/168, 169, 173; 710/67
See application file for complete search history.

(56) References Cited

FOREIGN PATENT DOCUMENTS

CN    1126332 A    7/1996

*Primary Examiner* — Albert Wong
(74) *Attorney, Agent, or Firm* — Altis Law Group, Inc.

(57) ABSTRACT

An electronic device providing number input is an input combination of a number input system. The number input system comprises three horizontal elements and four vertical elements arranged in the shape of the number "8." The electronic device provides a mechanism for a user to input numbers by pressing combinations of the elements.

7 Claims, 3 Drawing Sheets

ELECTRONIC DEVICE PROVIDING A NUMBER INPUT SYSTEM

BACKGROUND

1. Field of the Invention

Embodiments of the disclosure are related to input devices, and particularly to an electronic device providing a number input system.

2. Description of Related Art

Portable digital electronic devices in everyday use are small in size and thus portable. There are difficulties involved with adding more functionality to portable digital electronic devices while maintaining a compact size and portability.

Number input capability is an essential function required in most portable digital electronic devices. Currently, input capability is implemented in various technologies, such as keypad input, handwriting recognition, and voice recognition. Among these input technologies, voice recognition remains the furthest from maturity, and handwriting recognition occupies only a small fraction of market share, with the majority of applications use keypad input. Keypads in the portable digital electronic devices usually use 12 standard alphanumeric keys such as "0, 1, 2, 3, 4, 5, 6, 7, 8, 9, *, and #" Which take up value space on the portable digital electronic devices. Accordingly, there remains room for a further reduction in size of such portable digital electronic devices while still retaining input capability.

What is needed, therefore, is an electronic device providing number input with reduced size of the electronic device.

DETAILED DESCRIPTION OF CERTAIN INVENTIVE EMBODIMENTS

Figure 1:
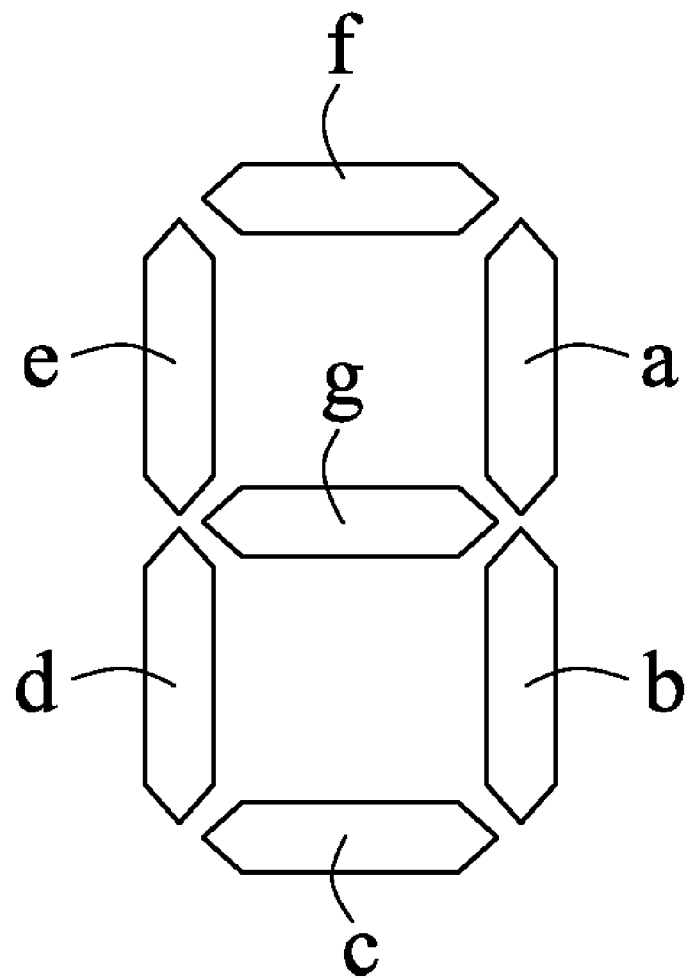
FIG. 1 is a schematic diagram of an embodiment of a number input system of an electronic device providing number input.

FIG. 1 is a schematic diagram of an embodiment of a number input system 1 of an electronic device providing number input. The number input system 1 displays an input combination of various segmented elements arranged in a shape of the number "8." The number input system 1 replaces a keypad of the electronic device.

The number input system 1 comprises three horizontal elements and four vertical elements arranged in the shape of the number "8." In the illustrated embodiment, the three horizontal elements of the number input system 1 from top to bottom are respectively labeled "f," "g" and "c." The upper vertical elements from left to right are respectively labeled "e" and "a," and the bottom vertical elements from left to right are respectively labeled "d" and "b."

Corresponding elements of the number input system 1 provide a number input interface for the electronic device according to a respective writing sequences of "0, 1, 2, 3, 4, 5, 6, 7, 8, 9." For example, 1 is input by pressing a combination of elements "a" and "b," 2 is input by pressing a combination of elements "f," "a," "g," "d" and "c," 3 is input by pressing a combination of elements "f," "a," "b," "c" and "g," 4 is input by pressing a combination of elements "e," "g," "a" and "b," 5 is input by pressing a combination of elements "f," "e," "g," "b" and "c," 6 is input by pressing a combination of elements "f," "e," "d," "c,""b" and "g," 7 is input by pressing a combination of elements "f," "a" and "b," 8 is input by pressing a combination of elements "a," "b," "c," "d," "e," "f" and "g," 9 is input by pressing a combination of elements "g," "e," "f," "a," "b" and "c," and 0 is input by pressing a combination of elements "a," "b," "c," "d," "e" and "f."

In other embodiments, corresponding elements of the number input system 1 providing number input according to respective writing sequences of "0, 1, 2, 3, 4, 5, 6, 7, 8, 9." may be adjusted to intelligently recognize user input and overcome mistakes therein. For example, 1 is input by pressing a combination of elements "a," "b" and "g," 2 is input by pressing a combination of elements "f," "a," "g," "e," "d" and "c," 3 is input by pressing a combination of elements "f," "a," "g," "d," "c" and "b," 4 is input by pressing a combination of elements "e," "d," "g," "a" and "b," 6 is input by pressing a combination of elements "e," "d," "c," "b" and "g," 7 is input by pressing a combination of elements "e," "f," "a" and "b," and 9 is input by pressing a combination of elements "g," "e," "f," "a" and "b."

Figure 2:
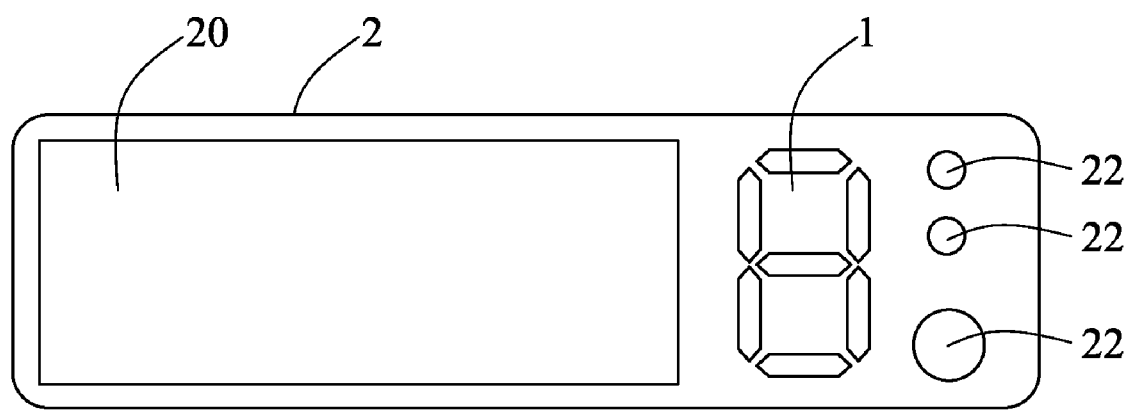
FIG. 2 is a block diagram of an embodiment of an electronic device providing number input.

FIG. 2 is a block diagram of an embodiment of an electronic device 2 comprising the number input system 1. In one embodiment, the number input system 1 may be embedded in the electronic device 2. Depending on the embodiment, the electronic device 2 may be a mobile phone, a personal digital assistant (PDA), a palm-top game console, a digital video player, a digital audio player, a remote controller, an electronic controller of a machinery, a Global Positioning System (GPS) console, a digital camera, a telephone, a microwave oven, or a digital calculator. Advantageously, the electronic device 2 may be a small electronic device with limited room for the number input system 1. The electronic device 2 includes the number input system 1, a display screen 20 and other input elements 22. Depending on the embodiment, the other input elements 22 may be configured as a "#"key, a "*"key and/or a dial key. Corresponding functionalities of the input elements 22 may also be embedded into the number input system 1 so as to make functionalities of the input elements 22 analogous to that of a portion or all elements.

In one embodiment, the number input system 1 is embedded in the electronic device 2 in the form of keys. If combinations of elements of the number input system 1 are entered to input numbers, the display screen 20 shows the corresponding numbers. In other embodiments, the number input system 1 may be embedded in the electronic device 2 in other forms. For example, the number input system 1 may provide touch sensors for emulating elements of the number input system 1 so as to input numbers, while the display screen 22 displays the corresponding numbers according to the corresponding touched elements. Additionally, for example, the number input system 1 may provide sensory feedback mechanism for confirmation of input.

Figure 3:
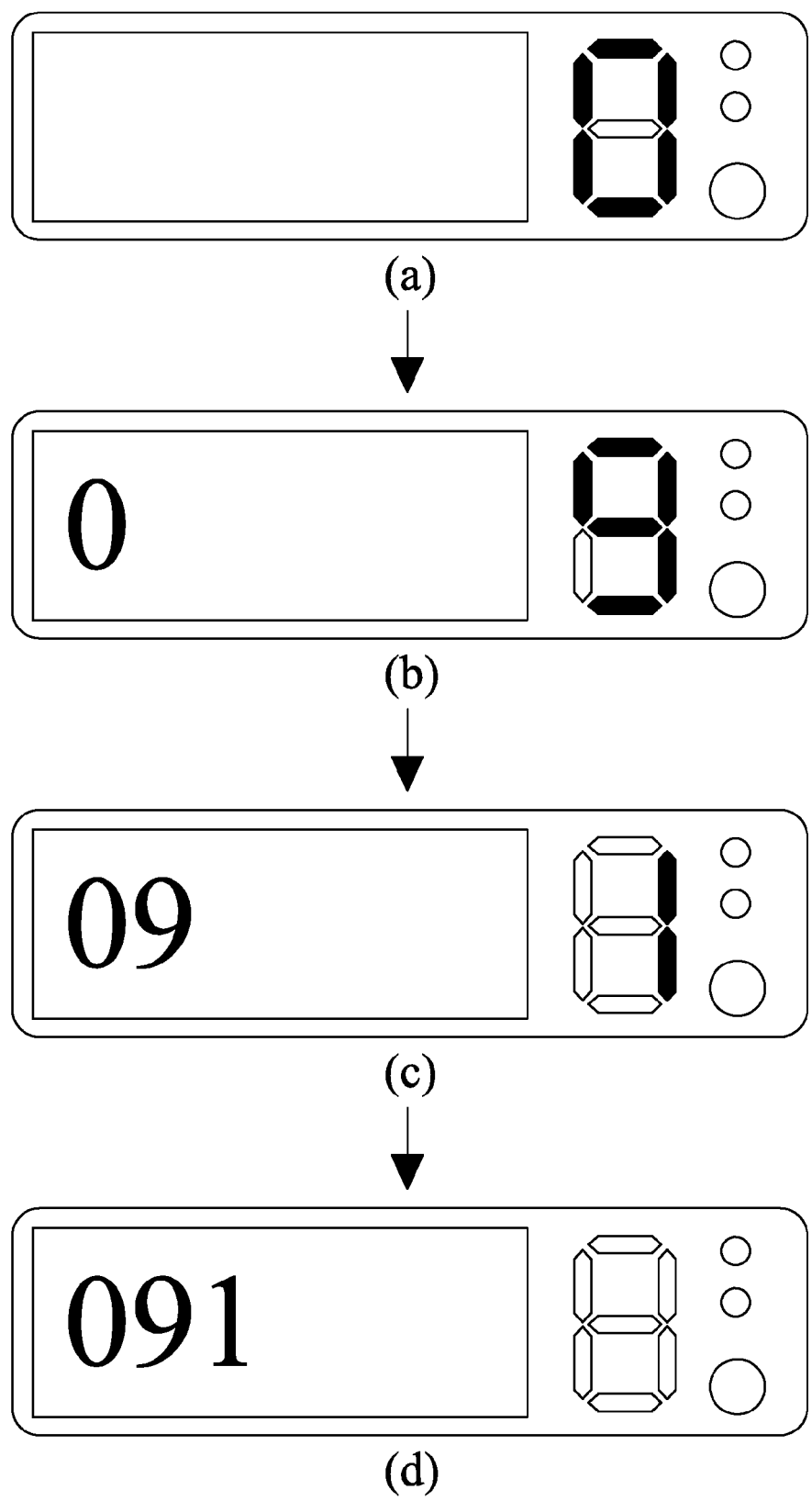
FIG. 3 is a graphic flowchart of an exemplary number entry on the electronic device providing number input.

FIG. 3 is a graphic flowchart of an exemplary number entry on the electronic device 2 comprising the number input system 1. For example, three numbers, such as 091 may be inputted into the electronic device 2 using the number input system 1 according to a respective writing sequences of "0, 9, 1," using steps (a), (b), and (c) in a sequence as demonstrated in FIG. 3. In step (a) of FIG. 3, 0 is input by a combination of elements "a," "b," "c," "d," "e" and "f." In step (b) of FIG. 3, after the display screen 22 shows the 0, 9 is input by a combination of elements "g," "e," "f," "a," "b" and "c." In step (c) of FIG. 3, after the display screen 22 shows the 0 and 9, 1 is input by a combination of elements "a" and "b." After input as described, in step d, the display screen 22 shows the 0, 9, and 1 as input.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An electronic device providing number input capabilities, the device comprising:
   a processor:
   a display;
   a number input system comprising a first segmented element, a first segmented element, a second segmented element, a third segmented element, a forth segmented element, a fifth segmented element, a sixth segmented element, a seventh segmented element;
   wherein the first segmented element, the second segmented element, and the third segmented elements are horizontal and parallel to each other, and wherein the first segmented element, the second segmented element, and the third segmented element are arranged from top to bottom respectively and are separated by a fixed distance;
   wherein the fourth segmented element, the fifth segmented element are vertical and parallel to each other, and wherein the first segmented element, the second segmented element, the fourth segmented element and the fifth segmented element collectively and substantially enclose a first area;
   wherein the sixth segmented element, the seventh segmented element are vertical and parallel to each other, and wherein the second segmented element, the third segmented element, the sixth segmented element and the seventh segmented element collectively and substantially enclose a second area;
   wherein the first aria is positioned on top of the second area so as to form the number eight;
   wherein contact with a corresponding one or more of the first to seventh segments displays a corresponding one or more numbers on the display;
   wherein a second number is input directly after a first number has been displayed on the display; and
   wherein the number inputted is adjusted by the processor to predict the user input when the input is inaccurate.

2. The device as claimed in claim 1, wherein the first segmented element of the number input system represents an element "f," the second segmented element represents an element "g," the third segmented element represents an element "c," the fourth segmented elements represents an element "e," the fifth segmented elements represents an element "a," the sixth segmented element represents an element "d," and the seventh segmented element represents an element "b."

3. The device as claimed in claim 2, wherein the number 1 is input by pressing a combination of elements "a" and "b," the number 2 is input by pressing a combination of elements "f," "a," "g," "d" and "c," the number 3 is input by pressing a combination of elements "f," "a," "b," "c" and "g," the number 4 is input by pressing a combination of elements "e," "g," "a" and "b," the number 5 is input by pressing a combination of elements "f," "e," "g," "b" and "c," the number 6 is input by pressing a combination of elements "f," "e," "d," "c," "b" and "g," the number 7 is input by pressing a combination of elements "f," "a" and "b," the number 8 is input by pressing a combination of elements "a," "b," "c," "d," "e," "f" and "g," the number 9 is input by pressing a combination of elements "g," "e," "f," "a," "b" and "c," and 0 is input by pressing a combination of elements "a," "b," "c," "d," "e" and "f."

4. The device as claimed in claim 2, wherein the number 1 is input by pressing a combination of elements "a," "b" and "g," the number 2 is input by pressing a combination of elements "f," "a," "g," "e," "d" and "c," the number 3 is input by pressing a combination of elements "f," "a," "b" and "g," the number 4 is input by pressing a combination of elements "e," "d," "g," "a," and "b," the number 6 is input by pressing a combination of elements "e," "d," "c," "b," and "g," the number 7 is input by pressing a combination of elements "e," "f," "a" and "b," and 9 is input by pressing a combination of elements "g," "e," "f," "a" and "b."

5. The device as claimed in claim 1, wherein the number input system comprises touch sensors for a sensing a contact by a user contacting one or more of the first to eight segmented elements of the number input system.

6. The device as claimed in claim 1,wherein the number input system provides a sensory feedback mechanism for confirmation of input.

7. The device as claimed in claim 1, wherein the device is selected from the group consisting of a mobile phone, a personal digital assistant, a palm-top game console, a digital video player, a digital audio player, a digital camera, a remote controller, a Global Positioning System (GPS) console, an electronic controller of a machinery, a telephone, a microwave oven, and a digital calculator.

* * * * *